United States Patent
Heubner

(10) Patent No.: US 8,939,268 B2
(45) Date of Patent: Jan. 27, 2015

(54) HYDRAULIC ACTUATING DEVICE FOR ACTUATION OF CLUTCHES IN, IN PARTICULAR, A MULTI-CLUTCH TRANSMISSION FOR MOTOR VEHICLES

(75) Inventor: Wilhelm Heubner, Itzgrund (DE)

(73) Assignee: FTE automotive GmbH, Ebern (DE)

( * ) Notice: Subject to any disclaimer, the term of this patent is extended or adjusted under 35 U.S.C. 154(b) by 217 days.

(21) Appl. No.: 13/489,499

(22) Filed: Jun. 6, 2012

(65) Prior Publication Data

US 2012/0312655 A1    Dec. 13, 2012

(30) Foreign Application Priority Data

Jun. 7, 2011 (DE) .......................... 10 2011 105 648

(51) Int. Cl.
*F16D 13/74* (2006.01)
*F16D 48/02* (2006.01)

(52) U.S. Cl.
CPC .... *F16D 48/0206* (2013.01); *F16D 2048/0269* (2013.01)
USPC ............... 192/48.601; 192/113.35; 192/70.12

(58) Field of Classification Search
CPC .................... F16D 2021/0653; F16D 2048/029
See application file for complete search history.

(56) References Cited

U.S. PATENT DOCUMENTS

| | | | |
|---|---|---|---|
| 5,850,898 A | 12/1998 | Bohme et al. | |
| 6,116,391 A | 9/2000 | Kremmling et al. | |
| 6,199,441 B1 * | 3/2001 | Kanenobu et al. | 74/331 |
| 6,626,056 B2 | 9/2003 | Albert et al. | |
| 7,766,139 B2 | 8/2010 | De Maziere et al. | |
| 8,662,272 B2 * | 3/2014 | Martin et al. | 192/48.601 |
| 2003/0047410 A1 * | 3/2003 | Busold et al. | 192/87.11 |
| 2005/0120818 A1 | 6/2005 | Matsufuji et al. | |
| 2008/0190729 A1 * | 8/2008 | Stehr et al. | 192/85 R |
| 2009/0032359 A1 | 2/2009 | Asano | |
| 2009/0032360 A1 | 2/2009 | Asano | |

FOREIGN PATENT DOCUMENTS

| | | |
|---|---|---|
| DE | 43 09 901 A1 | 9/1994 |
| DE | 197 16 473 A1 | 10/1998 |
| EP | 2 336 590 A2 | 6/2011 |
| JP | 2008291962 A | 12/2008 |
| WO | WO 2005/064187 A1 | 7/2005 |
| WO | WO 2006/002450 A1 | 1/2006 |

* cited by examiner

*Primary Examiner* — Gene Crawford
*Assistant Examiner* — Mark Manley
(74) *Attorney, Agent, or Firm* — Reising Ethington P.C.

(57) ABSTRACT

A hydraulic actuating device for actuation of clutches in a multi-clutch transmission for motor vehicles is disclosed, comprising a multi-circuit pump having an electric pump drive, at least two pressure circuits hydraulically connected with the pump, and a reservoir for hydraulic fluid, from which the fluid can be conveyed by the pump to the pressure circuits. In this regard, each pressure circuit starting from the pump comprises a non-return valve blocking in the direction of the pump, an electromagnetically actuable proportional throttle valve, by way of which the respective pressure circuit can be the subject of defined hydraulic relief in direction towards the reservoir, and at the outlet side a slave cylinder operatively connected with an associated clutch. The pump drive and the proportional throttle valves are electrically connected with a control unit, which co-ordinates the electrical activation of the pump drive and the proportional throttle valves.

3 Claims, 2 Drawing Sheets

HYDRAULIC ACTUATING DEVICE FOR ACTUATION OF CLUTCHES IN, IN PARTICULAR, A MULTI-CLUTCH TRANSMISSION FOR MOTOR VEHICLES

TECHNICAL FIELD

The present invention relates to a hydraulic actuating device for actuation of clutches. In particular, the invention relates to such an actuating device as is used in a number in multi-clutch transmissions for motor vehicles.

BACKGROUND OF THE INVENTION

Clutches for automatic shift gearboxes (ASG), twin-clutch or multi-clutch transmissions (TCT) as well as separable power-divider transmissions and transaxles are constructed as dry or wet clutches. Actuation thereof takes place either electromechanically or hydraulically, wherein hydraulic actuation due to the high power density of the actuators offers advantages with respect to physical arrangement in the transmission. Thus, the clutches can be actuated directly (by so-called 'central engagers or disengagers') and additional friction losses due to mechanical motion transmitting mechanisms or the like are avoided. The arrangement in the transmission or between motor and transmission also offers accommodation advantages relative to electromechanical actuation systems, which often protrude beyond the silhouette of the transmission and thus hamper installation of the transmission in the motor vehicle.

Known hydraulic actuation devices (see, for example, DE A-43 09 901, FIG. 1; DE-A-196 37 001, FIG. 27; DE-A-199 50 443, FIG. 11F) usually have a pressure generating unit or pumping and storage unit (so-termed 'powerpack'), a valve block with several electromagnetically actuable valves for distribution of the hydraulic energy to the individual actuators, lines for conducting fluid, and the actuators or cylinders themselves, optionally with integrated sensor system for positional determination of the setting elements. Activation of the hydraulic actuating device in a multi-clutch transmission for motor vehicles is usually carried out by way of a transmission control unit or a superordinate vehicle computer.

A disadvantage of hydraulic actuating devices of that kind with a storage unit is that the pressure medium, i.e. the hydraulic fluid, for charging of the storage unit has to be pumped to a pressure level far above the maximum required pressure in the actuators in order after removal of the required quantity to still be able to offer the requisite operating pressure, which is disadvantageous in terms of energy and significantly reduces the efficiency of the device. Moreover, the magnetic valves, which are predominantly constructed as slide valves, require a high level of fluid cleanliness due to the closely toleranced gaps and frequently oblige filtering measures. The slide valves employed nevertheless have a not insubstantial amount of leakage, which over a corresponding period of service leads to complete discharging of the storage unit, which has the consequence of delay of the first actuation by the time for charging the storage unit. Also, in the case of driving without changing gear, for example on a motorway, recharging of the storage unit at regular intervals is therefore required, which is equally disadvantageous in terms of energy. Finally, the valve block with the magnetic valves takes up a considerable amount of installation space in the transmission and represents the greatest cost factor within the described actuating device.

What is desired is to provide for the actuation of clutches in, in particular, a multi-clutch transmission for motor vehicles, a hydraulic actuating device which avoids the above disadvantages and by comparison with the outlined prior art has above all a significantly improved overall efficiency with lower costs.

SUMMARY OF THE INVENTION

According to one aspect of the invention a hydraulic actuating device for actuation of clutches in, in particular, a multi-clutch transmission for motor vehicles comprises a multi-circuit pump having an electric pump drive, at least two pressure circuits hydraulically connected with the pump, and a reservoir for hydraulic fluid, from which the hydraulic fluid can be conveyed to the pressure circuits by the pump, wherein each pressure circuit has, starting from the pump, a non-return valve blocking in the direction of the pump and an electromagnetically actuable proportional throttle valve, by way of which the respective pressure circuit can be hydraulically relieved in defined manner in direction towards the reservoir, as well as at the output or force delivery side a slave cylinder which is operatively connected with an associated clutch, and wherein the pump drive and the proportional throttle valves are electrically connected with a control unit which co-ordinates the electrical activation of the pump drive and the proportional throttle valves.

If one of the clutches is to be actuated, the following briefly stated co-ordination is possible with respect to this clutch: By way of the control unit the proportional throttle valve of the corresponding pressure circuit is electromagnetically actuated and the pump drive started, whereupon the pressure building up in this pressure circuit hydraulically acts on the respective slave cylinder, which in turn actuates the clutch. When the desired pressure in the corresponding pressure circuit is reached the pump drive can be stopped, in which case the pressure between the non-return valve and the proportional throttle valve of this pressure circuit remains locked in place and continues to act in the respective slave cylinder. In correspondence with the respective actuating requirements this proportional throttle valve can then be so activated by the control unit that the corresponding pressure circuit—and thus the respective slave cylinder—is hydraulically relieved in defined manner in direction towards the reservoir. Further clutches can be actuated, in a given case even simultaneously, in analogous manner via the further pressure circuits.

It is thus possible in conceptually simple manner and with comparatively low outlay on technical hardware, therefore with low costs, to actuate a plurality of clutches in, in particular, a multi-clutch transmission for motor vehicles without a storage unit being required for that purpose or slide valves—and thus a heightened level of oil cleanliness—being needed. Because only one pump drive has to be supplied with current only when a clutch is to be actuated and only to such an extent as is required for the operating pressure needed in the corresponding pressure circuit for generating a movement at the respective slave cylinder the energy balance is better than in the afore-described prior art.

In principle it is possible in the co-ordination of the current conduction of pump drive and proportional throttle valve or valves by the control unit to operate only with computation models which (inter alia) take into consideration the known dependencies between the current conduction of the pump drive, the rotational speed of the pump and the generated volume flow on the one hand and the hydraulically effective areas in the pressure circuit and the forces to be applied to the respective clutch on the other hand. However, it is preferable if each pressure circuit has a pressure sensor so that the pressure actually present at the respective slave cylinder can be detected and supplied to the control unit, which thereupon suitably activates the corresponding proportional throttle valve and, in a given case, the pump drive.

For preference, each proportional throttle valve in the non-activated state is switched to the throughflow zero setting so that no pressure can build up in the respective pressure circuit without application of current to the valve. Since in each instance two elements (pump drive and proportional throttle valve) thus have to be activated in order to initiate movement at the respective slave cylinder, reliability with respect to erroneous actuations is significantly increased.

Finally, it is preferable if a first clutch cooling unit is connected between an outlet of the proportional throttle valve of a first pressure circuit and the reservoir and is associated with the clutch operatively connected with the slave cylinder of a second pressure circuit, while a second clutch cooling device is connected between an outlet of the proportional throttle valve of the second pressure circuit and the reservoir and is associated with the clutch operatively connected with the slave cylinder of the first pressure circuit, so that the hydraulic fluid flowing out of the first pressure circuit serves, by way of the first clutch cooling device, for cooling the clutch at the second pressure circuit, while the hydraulic fluid flowing out of the second pressure circuit serves, by way of the second clutch cooling device, for cooling the clutch at the first pressure circuit. Thus, a just-actuated clutch can advantageously be cooled by the hydraulic fluid which flows out of the pressure circuit, which is associated with a currently unactuated clutch, substantially without pressure by way of the proportional throttle valve thereof.

This cooling principle can obviously be translated without problems to systems with more than two clutches. In the case of three clutches, for example, the actuating device would comprise a first pressure circuit for actuation of a first clutch, with a first proportional throttle valve, with the outlet of which a first clutch cooling device is connected, a second pressure circuit for actuation of a second clutch, with a second proportional throttle valve, with the outlet of which a second clutch cooling device is connected, and a third pressure circuit for actuation of a third clutch, with a third proportional throttle valve, with the outlet of which a third clutch cooling device is connected, wherein the first clutch cooling device would be associated with the second clutch, the second clutch cooling device with the third clutch and, finally, the third clutch cooling device with the first clutch. The procedure would be analogous with more than three clutches.

BRIEF DESCRIPTION OF THE DRAWINGS

The invention is explained in more detail in the following on the basis of preferred embodiments with reference to the accompanying schematic drawings, in which the same reference numerals—in a given case supplemented by an apostrophe (') or two apostrophes (")—characterize the same or corresponding parts and in which.

Figure 1:
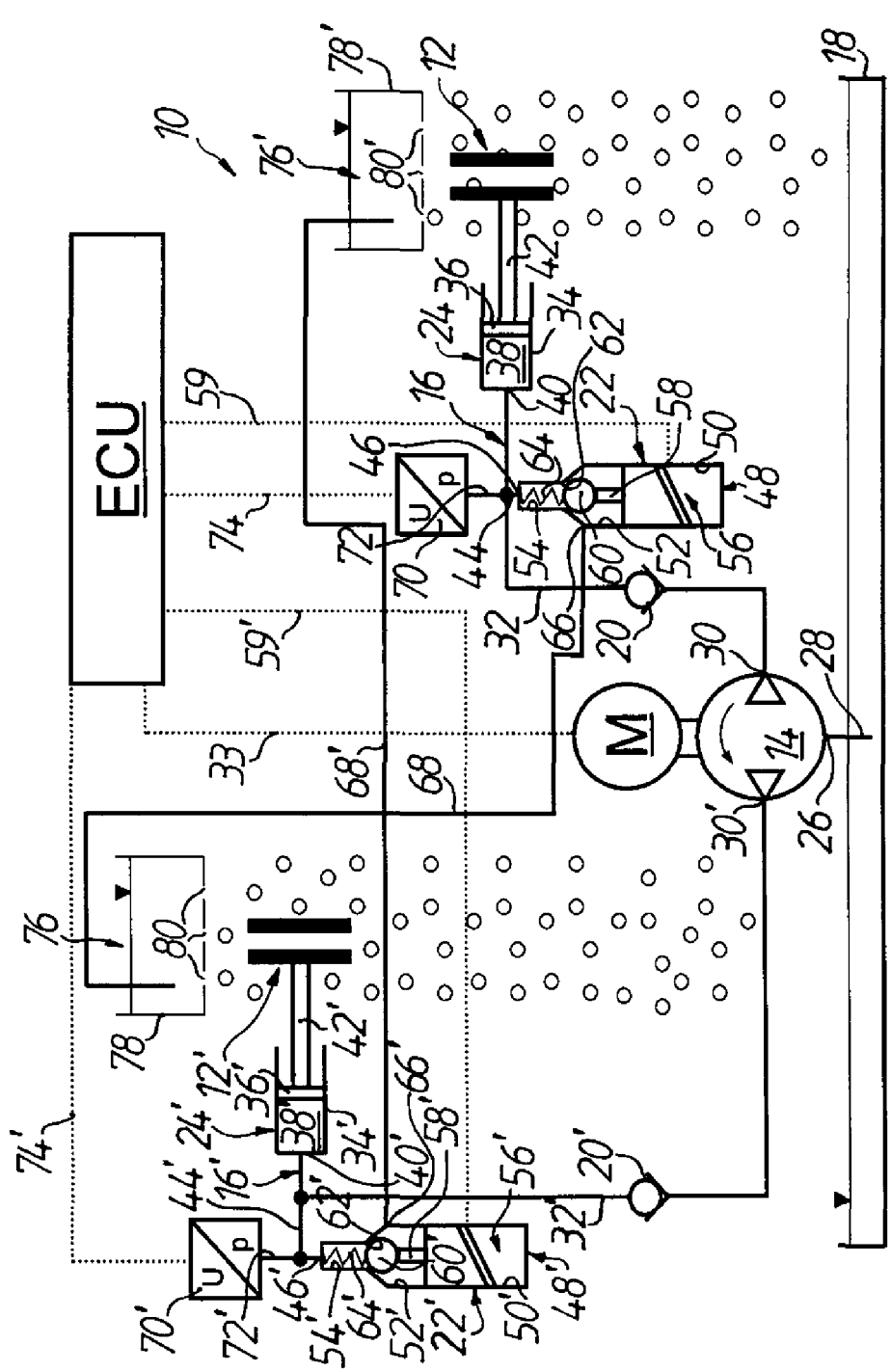
FIG. 1 shows a circuit diagram of a hydraulic actuating device for actuation of two clutches in, for example, a twin-clutch transmission for motor vehicles as a first embodiment according to the invention, in which also a clutch cooling for two clutches constructed as wet clutches is provided.

Illustration of the elements operatively connected by way of the clutches, i.e. the corresponding parts of the twin-clutch transmission or the hybrid drive train, was dispensed with in the drawings and in the following description, since these elements and the function thereof are sufficiently known to the expert and explanations with respect thereto do not appear necessary for an understanding of the present invention.

DETAILED DESCRIPTION OF THE EMBODIMENTS

In FIG. 1 the reference numeral 10 generally denotes a hydraulic actuating device for actuation of two wet clutches 12, 12'. As will be described in more detail in the following, the hydraulic actuating device 10 comprises a multi-circuit—here twin circuit—pump 14, which has an electric pump drive M, in the illustrated embodiment two pressure circuits 16, 16', which are hydraulically connected with the pump 14, and a reservoir 18 for hydraulic fluid, from which the hydraulic fluid can be conveyed by the pump 14 to the pressure circuits 16, 16'. Each of the pressure circuits 16, 16' comprises, starting from the pump 14, a non-return valve 20, 20' blocking in the direction of the pump 14 and an electromagnetically actuable proportional throttle valve 22, 22' by way of which the respective pressure circuit 16, 16' can be hydraulically relieved in defined manner in direction towards the reservoir 18, as well as at the outlet side a slave cylinder 24, 24' operatively connected with the respectively associated wet clutch 12, 12', wherein the pump drive M and the proportional throttle valves 22, 22' are electrically connected with a control unit ECU which produces and co-ordinates the electrical activation of the pump drive M and the proportional throttle valve 22, 22'.

The pump 14 has a pump inlet 26 which is hydraulically connected with the reservoir 18 by way of a suction duct 28. In addition, the pump 14 has two pump outlets 30, 30' which are connected with pressure lines 32, 32' of the pressure circuit 16, 16'. Usable as pump types are, for example, gearwheel pumps, roller cells pumps, vane pumps and radial or axial piston pumps wherein the multi-circuitry is guaranteed in a manner known per se by parallel connection of the displacement elements and/or suitable design of the pump housing, such as, for example, in the case of a double-stroke vane pump with oval stroke-ring form of the stator. For the present application it is sufficient if the pump 14 is constructed as a constant pump which delivers a constant volume flow for a predetermined rotational speed of the pump drive M. The pump drive M can optionally be controllable in rotational speed in order to be able to react to possible pressure fluctuations and to also make possible, at low rotational speeds an 'adjusting movement' of hydraulic fluid in the pressure circuit 16, 16'. The application of current to or the activation of the pump drive M is for that matter carried out by way of a power supply cable 33, which is illustrated by way of dotted line in FIG. 1 and which is electrically connected with the control unit ECU.

The pressure lines 32, 32' hydraulically connect the pump outlets 30, 30' with the slave cylinders 24, 24', wherein one of the non-return valves 20, 20' is connected into each pressure line 32 or 32'. The non-return valves 20, 20' can be biased into their setting which blocks in the direction of the pump 14; however, this is not shown in the figures.

The slave cylinders 24, 24' each comprise, in a manner known per se, a respective cylinder housing 34, 34' in which a piston 36 or 36' is guided to be longitudinally displaceable. The piston 36, 36' bounds, together with the cylinder housing 34 or 34', a pressure chamber 38 or 38' which can be loaded with the hydraulic fluid by way of a pressure connection 40 or 40'. For this purpose the pressure lines 32, 32' of the pressure circuits 16, 16' are connected with the pressure connections 40, 40'. On the side of each piston 36, 36' remote from the pressure chamber 38, 38' a piston rod 42, 42' is attached thereto and is disposed in operative connection by way of the respective slave cylinder 24, 24' with the wet clutch 12, 12' associated therewith. Although in the illustrated embodiment the slave cylinders 24, 24' are illustrated in 'classic' mode of construction, these can equally be—even if only in part—so-termed 'central disengagers' or 'central engagers', such as are described in, for example, DE-A-197 16 473 of the present applicant which is incorporated herein by reference.

Branching off between the non-return valve 20, 20' and the slave cylinder 24, 24' from each pressure duct 32, 32' is a valve line 44, 44' which is connected with a pressure connection 46, 46' of the respective proportional throttle valve 22, 22'. In the illustrated embodiment the latter is constructed as an electromagnetically actuable 2/2 spherical-seat valve, which in non-activated state is switched to a throughflow zero setting as is known in principle from DE-A-196 33 420 (FIG. 4) of the present applicant which is incorporated herein by reference.

Accordingly, the proportional throttle valve 22, 22' comprises a three-chambered valve housing 48, 48' which has an armature chamber 50, 50', an outflow chamber 52, 52' and a pressure chamber 54, 54', wherein the pressure connection 46, 46' opens into the last-mentioned. A magnetic drive 56, 56' made of a ferromagnetic armature and a magnet coil, which at least partly concentrically surrounds the armature and which is attached to the radial wall of the armature chamber 50, 50' (the individual parts of the magnetic drive are not shown in more detail in the figures), is accommodated in the armature chamber 50, 50'. A valve pin 58, 58', which protrudes in sealed manner into the outflow chamber 52, 52', is centrally mounted on the piston-like armature, which is axially displaceable in the armature chamber 50, 50'. When current is applied to the magnet drive 56, 56' the valve pin 58, 58' can be displaced in defined manner by way of the armature in the axial direction of the valve housing 48, 48'. The application of current to the magnetic drives 56, 56' takes place by way of power supply cables 59, 59' which are shown in dotted lines in FIG. 1 and which are electrically connected with the control unit ECU.

A valve body 60, 60', which is constructed as a metallic ball able to mechanically loaded with an actuating force by way of the valve pin 58, 58', is arranged in the outflow chamber 52, 52', which is axially connected with the armature chamber 50, 50'. The valve body 60, 60' can be loaded by way of the valve pin 58, 58' only with a pressure force, since the valve body 60, 60' and the valve pin 58, 58' are two separate components.

The pressure chamber 54, 54' of smaller diameter is connected with the outflow chamber 52, 52'. An annular valve seat 62, 62' is formed at the end of the pressure chamber 54, 54', which is at the outflow chamber side, centrally with respect to the centre axis of the valve housing 48, 48' and bounds together with the valve body 60, 60' a valve gap having a throughflow cross-section corresponding with the throttle cross-section of the proportional throttle valve 22, 22'. A restoring spring 64, 64' urging the valve body 60, 60' against the valve pin 58, 58' of the magnetic drive 56, 56' is arranged in the pressure chamber 54, 54'.

In the throughflow zero setting, which is not illustrated in the figures, of the proportional throttle valves 22, 22' the respective valve gap between valve body 60, 60' and valve seat 62, 62' is opened to a maximum by the restoring force of the restoring spring 64, 64', wherein the armature of the magnetic drive 56, 56' is directly urged by way of the valve body 60, 60' and the valve pin 58, 58' against an abutment (not shown) at the end of the armature chamber 50, 50' remote from the outflow chamber 52, 52'. The maximum possible stroke of the armature in the armature chamber 50, 50' corresponds at least with the closing path of the valve gap between the valve body 60, 60' and the valve seat 62, 62', so that the valve gap can be set in defined manner through axial displacement of the valve pin 58, 58' by the magnetic drive 56, 56'.

Finally, each proportional throttle valve 22, 22' has an outflow connection 66, 66' which opens into the outflow chamber 52, 52'. By way of the outflow connection 66, 66' the hydraulic fluid can, after passing the—in a given case—opened valve gap between valve body 60, 60' and valve seat 62, 62' flow substantially free of pressure out of the proportional throttle valve 22, 22'. For this purpose an outflow line 68, 68' is connected with each outflow connection 66, 66'.

In addition, it can be seen in FIG. 1 that each of the pressure circuits 16, 16' has a pressure sensor 70, 70'. The latter is connected by way of a hydraulic sensor line 72, 72' with the respective pressure line 32, 32' between the respective non-return valve 20, 20' and the respective slave cylinder 24, 24' and thus detects the hydraulic pressure actually present at the respective slave cylinder 24, 24'. Electrical signal lines 74, 74' connect the pressure sensors 70, 70' with the control unit ECU.

Moreover, in the embodiment illustrated in FIG. 1 a clutch cooling of the wet clutches 12, 12' is realized. In this regard, connected between one outlet of the proportional throttle valve 22 of the outflow connection 66, which forms one or the first pressure circuit 16, of the proportional throttle valve 22 and the reservoir 18 is a first clutch cooling device 76 which is associated with the wet clutch 12' operatively connected with the slave cylinder 24' of the other or second pressure circuit 16', whereas connected between the outflow connection 66', which forms an outlet of the proportional throttle valve 22' of the second pressure circuit 16', of the proportional throttle valve 22' and the reservoir 18 is a further or second clutch cooling device 76' which is associated with the wet clutch 12 operatively connected with the slave cylinder 24 of the first pressure circuit 16. The clutch cooling devices 76, 76' can—as indicated in FIG. 1-*comprise*, for example, containers 78, 78' which are supplied with hydraulic fluid by way of the outflow lines 68, 68' and from each of which hydraulic fluid is delivered, via one or more throttle points 80, 80', drip-by-drip for cooling the respective wet clutch 12, 12' and ultimately collects again in the reservoir 18. As a result, the hydraulic fluid flowing out of the first pressure circuit 16 serves, via the first clutch cooling device 76, for cooling the wet clutch 12' at the second pressure circuit 16', whereas the hydraulic fluid flowing out of the second pressure circuit 16' serves, by way of the second clutch cooling device 76', for cooling the wet clutch 12 at the first pressure circuit 16.

In the system shown in FIG. 1 with two wet clutches 12, 12' and construction of the slave cylinder 24, 24' as an engager the following procedure, for example, is possible with the aforedescribed hydraulic actuating device 10, wherein the control unit ECU suitably activates and co-ordinates the pump drive M and the proportional throttle valves 22, 22'.

When the system is not activated, both wet clutches 12, 12' are separated. The actuating device 10 is either completely without current or the pump drive M conducts current in the case of a requirement for cooling at the wet clutches 12, 12', so that the pump 14 conveys hydraulic fluid into the pressure circuits 16, 16' from the reservoir 18, while the proportional throttle valves 22, 22' remain free of current and are thus disposed in their throughflow zero setting. As a result, mutual cooling of the wet clutches 12, 12' takes place, via the clutch cooling devices 76, 76', by the volume flows flowing out from the proportional throttle valves 22, 22' via the outflow lines 68, 68' (volume flow from valve 22 to clutch 12' and volume flow from valve 22' to clutch 12).

For engagement of, for example, the wet clutch 12 on the right in FIG. 1 both the pump drive M and the corresponding proportional throttle valve 22, i.e. that on the right in FIG. 1, conduct current so that the pump 14 conveys hydraulic fluid (also) in the pressure circuit 16 and in the proportional throttle valve 22 the valve body 60 is urged by the magnetic drive 56 via the valve pin 58 against the force of the restoring spring 64 towards the valve seat 62. Consequently, a pressure builds up in the pressure chamber 54 of the proportional throttle valve 22 and thus between the non-return valve 20 and the slave cylinder 24, which pressure acts by way of the pressure chamber 38 of the slave cylinder 24 on the piston 36 thereof and ultimately leads to displacement of the piston rod 42 for engagement of the wet clutch 12. The hydraulic fluid pumped by the pump 14 at the same time in the other pressure circuit 16' flows out via the proportional throttle valve 22', which is not current-conducting and is therefore open, by way of the outflow line 68' to the second clutch cooling device 76' and thus serves for cooling the engaged wet clutch 12. In analogous manner, the wet clutch 12' on the left in FIG. 1 can be engaged or also both wet clutches 12, 12' at the same time, wherein in the latter case no cooling takes place if the containers 78, 78' are empty.

If a system state with at least one engaged wet clutch 12, 12', for example the wet clutch 12 on the right in FIG. 1, is to be maintained the corresponding proportional throttle valve 22, i.e. that on the right in FIG. 1, conducts current in correspondence with the required load point so that the pressure at the slave cylinder 24 is maintained by way of the biased proportional throttle valve 22 and the non-return valve 20 without the pump 14 having to be operated in that case. In analogous manner, the wet clutch 12' on the left in FIG. 1 can be kept in an engaged state or also both wet clutches 12, 12' at the same time.

Transfer of torque from one to the other wet clutch 12, 12' can, in addition, take place as outlined in, for example, the following, starting from, for example, the following system state: Righthand clutch 12 engaged, lefthand clutch 12' disengaged, righthand valve 22 conducts current, lefthand valve 22' and pump drive M not conducting current. The control unit ECU initially lets the pump 14 start up through application of current to the pump drive M. The proportional throttle valve 22 for the wet clutch 12 on the right in FIG. 1 is then continuously relieved, wherein the valve current present at the magnetic drive 56 is regulated in correspondence with the known clutch characteristic curve, which is filed in the control unit ECU, of the righthand wet clutch 12 so that the pressure in the pressure circuit 16 suitably drops and the piston 36 in the slave cylinder 24 consequently moves in the sense of defined 'disengagement' to the left. At the same time, the proportional throttle valve 22' for the wet clutch 12' on the left in FIG. 1 conducts current, wherein the valve current present at the magnetic drive 56' is regulated in correspondence with the similarly known clutch characteristic curve, which is filed in the control unit ECU, of the lefthand wet clutch 12' so that the pressure in the pressure circuit 16' suitably rises and thus the piston 36' in the slave cylinder 24' moves in the sense of defined 'engagement' to the right. In the case of, for example, a twin-clutch transmission the current regulation at the proportional throttle valves 22, 22' is to be matched to one another in such a manner that switching is possible without interruption of traction force. On attainment of the predetermined pressures in the pressure circuits 16, 16' and thus the desired positions of the piston rods 42, 42' at the slave cylinders 24, 24' the control unit ECU switches off the pump 14 through interruption of the application of current to the pump drive M. A transmission of torque from the 'left' in FIG. 1 to the 'right' in FIG. 1 can obviously take place in analogous manner.

The entire system is unloaded by switching the pump drive M and the proportional throttle valves 22, 22', by the control unit ECU, to be completely without current.

In the case of construction of the slave cylinder 24, 24' as a disengager the system is simply to be operated in reverse, i.e. loading for separation of the clutches 12, 12' and relieving for connection of the same. The realization of the cooling of the wet clutches 12, 12' (which valve return volume flow flows away via which clutch) can, moreover, be carried out on the basis of the heat balance of usual switching cycles, i.e. optionally also different from that shown in FIG. 1.

The afore-described hydraulic actuation device can obviously also be enlarged, depending on the respective transmission construction, by further setter branches—each comprising a further pump stage, further non-return valve and further proportional throttle valve—which in correspondence with the respective actuation requirements can be operated simultaneously or also offset in time relative to one another.

The second embodiment shall be described in the following with reference to FIG. 2 only to the extent that it differs from the first embodiment described with reference to FIG. 1.

Figure 2:
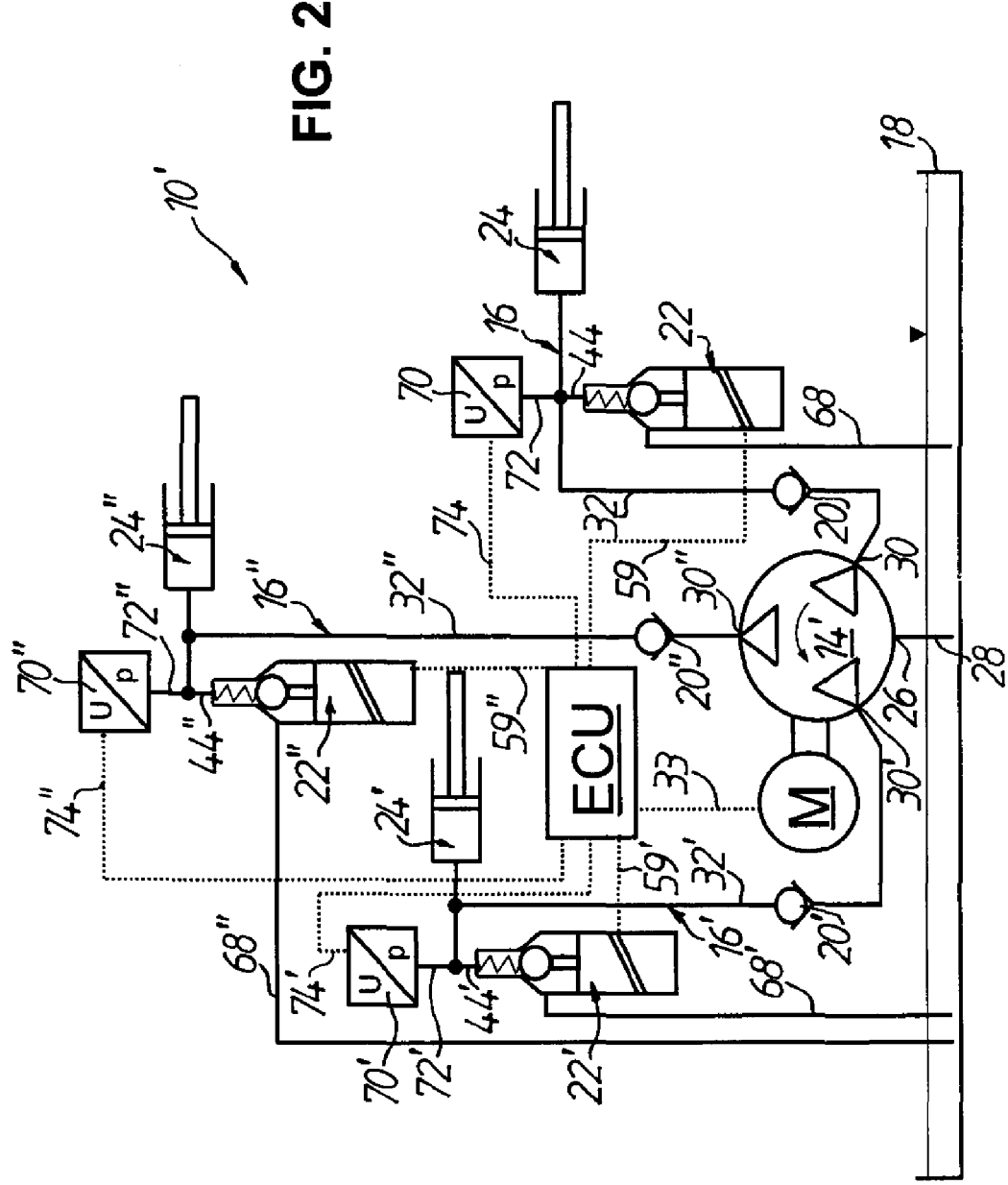
FIG. 2 shows a circuit diagram of a hydraulic actuating device for actuation of three clutches, which are constructed as dry clutches, as a second embodiment according to the invention, such as is used in, for example, a hybrid drive train of a hybrid vehicle, in which three drive components—petrol engine, asynchronous motor and flywheel—can deliver their power to the wheels of the hybrid vehicle by way of an intermediate shaft through appropriate actuation of the three dry clutches and a stepless transmission.

By contrast to the first embodiment the hydraulic actuating device 10' according to FIG. 2 comprises a triple-circuit pump 14' which can be, for example, a triple-stroke vane pump with special stator cam track ('triangular' with rounded corners) allowing several suction and pressure strokes per revolution. Connected to the pump 14' is a total of three pressure circuits 16, 16', 16", which do not differ from the pressure circuit 16, 16' of the first embodiment. The clutches (not shown in FIG. 2 for the sake of better clarity) actuated by the slave cylinders 24, 24', 24" of the second embodiment are, however, three dry clutches which to that extent do not need fluid cooling and thus the clutch cooling devices of the first embodiment. By contrast to the first embodiment, therefore, in the second embodiment the outflow lines 68, 68', 68" lead directly from the proportional throttle valves 22, 22', 22" back to the reservoir 18.

It will be evident to the expert that in the case of this embodiment as well the slave cylinders 24, 24', 24" can be hydraulically loaded or relieved in correspondence with the respective actuation requirements by suitable activation of the pump drive M and the proportional throttle valves 22, 22', 22" by the control unit ECU in order to generate the respective engagement or disengagement movements, wherein, in particular, maintaining the respective system state can take place very advantageously in terms of energy with comparatively small outlay on technical hardware.

A hydraulic actuating device for actuation of clutches in, in particular, a multi-clutch transmission for motor vehicles is disclosed, comprising a multi-circuit pump having an electric pump drive, at least two pressure circuits hydraulically connected with the pump and a reservoir for hydraulic fluid, from which the fluid can be conveyed to the pressure circuits by the pump. In this regard, each pressure circuit starting from the pump has a non-return valve blocking in the direction of the pump and an electromagnetically actuable proportional throttle valve, by way of which the respective pressure circuit can be subject to defined hydraulic relief in direction towards the reservoir, as well as at the outlet side a slave cylinder operatively connected with an associated clutch. The pump drive and the proportional throttle valves are electrically connected with a control unit, which co-ordinates the electrical activation of the pump drive and the proportional throttle valves. As a result, a clutch actuation with a high overall efficiency and with reduced costs is possible.

Variations and modifications are possible without departing from the scope and spirit of the present invention as defined by the appended claims.

The embodiments in which an exclusive property or privilege is claimed are defined as follows:

1. A hydraulic actuating device for actuation of clutches for motor vehicles comprising:
   a multi-circuit pump having an electric pump drive, at least two pressure circuits hydraulically connected with the pump,
   a reservoir for hydraulic fluid, from which the hydraulic fluid can be conveyed by the pump to the pressure circuits,
   wherein each pressure circuit starting from the pump comprises a non-return valve blocking in a direction of the pump, an electromagnetically actuable proportional throttle valve by way of which the respective pressure circuit can be a subject of defined hydraulic relief in direction towards the reservoir,
   at an outlet side a slave cylinder operatively connected with an associated clutch, wherein the pump drive and the proportional throttle valves are electrically connected with a control unit which co-ordinates electrical activation of the pump drive and the proportional throttle valves,
   each pressure circuit comprises a pressure sensor,
   the proportional throttle valve when in a non-activated state is switched to a throughflow zero setting, and
   wherein connected between an outlet of the proportional throttle valve of a first pressure circuit and the reservoir is a first clutch cooling device which is associated with the clutch operatively connected with the slave cylinder of a second pressure circuit, while connected between an outlet of the proportional throttle valve of the second pressure circuit and the reservoir is a second clutch cooling device which is associated with the clutch operatively connected with the slave cylinder of the first pressure circuit, so that the hydraulic fluid flowing out of the first pressure circuit serves by way of the first clutch cooling device for cooling the clutch at the second pressure circuit, while the hydraulic fluid flowing out of the second pressure circuit serves by way of the second clutch cooling device for cooling the clutch at the first pressure circuit.

2. A hydraulic actuating device for actuation of clutches for motor vehicles comprising:
   a multi-circuit pump having an electric pump drive, at least two pressure circuits hydraulically connected with the pump,
   a reservoir for hydraulic fluid, from which the hydraulic fluid can be conveyed by the pump to the pressure circuits,
   wherein each pressure circuit starting from the pump comprises, a non-return valve blocking in a direction of the pump, an electromagnetically actuable proportional throttle valve by way of which the respective pressure circuit can be a subject of defined hydraulic relief in direction towards the reservoir,
   at an outlet side a slave cylinder operatively connected with an associated clutch, wherein the pump drive and the proportional throttle valves are electrically connected with a control unit which co-ordinates electrical activation of the pump drive and the proportional throttle valves,
   the proportional throttle valve when in a non-activated state is switched to a throughflow zero setting, and
   wherein connected between an outlet of the proportional throttle valve of a first pressure circuit and the reservoir is a first clutch cooling device which is associated with the clutch operatively connected with the slave cylinder of a second pressure circuit, while connected between an outlet of the proportional throttle valve of the second pressure circuit and the reservoir is a second clutch cooling device which is associated with the clutch operatively connected with the slave cylinder of the first pressure circuit, so that the hydraulic fluid flowing out of the first pressure circuit serves by way of the first clutch cooling device for cooling the clutch at the second pressure circuit, while the hydraulic fluid flowing out of the second pressure circuit serves by way of the second clutch cooling device for cooling the clutch at the first pressure circuit.

3. A hydraulic actuating device for actuation of clutches for motor vehicles comprising:
   a multi-circuit pump having an electric pump drive, at least two pressure circuits hydraulically connected with the pump,
   a reservoir for hydraulic fluid, from which the hydraulic fluid can be conveyed by the pump to the pressure circuits,
   wherein each pressure circuit starting from the pump comprises,
   a non-return valve blocking in a direction of the pump, an electromagnetically actuable proportional throttle valve by way of which the respective pressure circuit can be a subject of defined hydraulic relief in direction towards the reservoir,
   at an outlet side a slave cylinder operatively connected with an associated clutch, wherein the pump drive and the proportional throttle valves are electrically connected with a control unit which co-ordinates electrical activation of the pump drive and the proportional throttle valves, and
   wherein connected between an outlet of the proportional throttle valve of a first pressure circuit and the reservoir is a first clutch cooling device which is associated with the clutch operatively connected with the slave cylinder of a second pressure circuit, while connected between an outlet of the proportional throttle valve of the second pressure circuit and the reservoir is a second clutch cooling device which is associated with the clutch operatively connected with the slave cylinder of the first pressure circuit, so that the hydraulic fluid flowing out of the first pressure circuit serves by way of the first clutch cooling device for cooling the clutch at the second pressure circuit, while the hydraulic fluid flowing out of the second pressure circuit serves by way of the second clutch cooling device for cooling the clutch at the first pressure circuit.

* * * * *